(12) United States Patent
Kim et al.

(10) Patent No.: US 11,380,900 B2
(45) Date of Patent: Jul. 5, 2022

(54) ANODE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Yongho Kim, Yongin-si (KR); Junghyun Nam, Yongin-si (KR); Seyeong Kang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 283 days.

(21) Appl. No.: 16/341,141

(22) PCT Filed: Sep. 29, 2017

(86) PCT No.: PCT/KR2017/011042
§ 371 (c)(1),
(2) Date: Apr. 11, 2019

(87) PCT Pub. No.: WO2018/070735
PCT Pub. Date: Apr. 19, 2018

(65) Prior Publication Data
US 2020/0194797 A1     Jun. 18, 2020

(30) Foreign Application Priority Data
Oct. 12, 2016   (KR) ........................ 10-2016-0132072

(51) Int. Cl.
*H01M 4/66*  (2006.01)
*H01M 4/62*  (2006.01)
(Continued)

(52) U.S. Cl.
CPC .......... *H01M 4/667* (2013.01); *H01M 4/622* (2013.01); *H01M 10/0525* (2013.01); *H01M 50/46* (2021.01)

(58) Field of Classification Search
None
See application file for complete search history.

(56) References Cited

U.S. PATENT DOCUMENTS

2006/0199294 A1*  9/2006  Fujikawa .......... H01M 10/0525
                                                       438/42
2007/0072083 A1    3/2007  Ikuta et al.
(Continued)

FOREIGN PATENT DOCUMENTS

CN    101006595 A    7/2007
CN    102760860 A    10/2012
(Continued)

OTHER PUBLICATIONS

Korean Office Action dated Jan. 15, 2021 for corresponding Korean Patent Application No. 10-2016-0132072.
(Continued)

*Primary Examiner* — Haroon S. Sheikh
(74) *Attorney, Agent, or Firm* — Lee IP Law, P.C.

(57) ABSTRACT

Provided are an anode for a lithium secondary battery and a lithium secondary battery comprising the same. The anode comprises: a current collector; an anode active material layer disposed on the current collector; and a coating layer disposed on the anode active material layer and including an inorganic material and a binder polymer, wherein the binder polymer has a decomposition temperature of 100° C. to 400° C., and an elastic modulus of 1.0 GPa to 3.0 GPa at 220° C. or lower.

12 Claims, 4 Drawing Sheets

(51) Int. Cl.
*H01M 10/0525* (2010.01)
*H01M 50/46* (2021.01)

(56) References Cited

U.S. PATENT DOCUMENTS

| | | | |
|---|---|---|---|
| 2008/0138699 A1 | 6/2008 | Kim et al. | |
| 2009/0305141 A1 | 12/2009 | Lee et al. | |
| 2010/0068613 A1* | 3/2010 | Deguchi | H01M 10/0568 |
| | | | 429/129 |
| 2010/0159314 A1 | 6/2010 | Kim et al. | |
| 2010/0221607 A1 | 9/2010 | Hatanaka et al. | |
| 2011/0003209 A1 | 1/2011 | Katayama et al. | |
| 2012/0141877 A1* | 6/2012 | Choi | H01M 4/13 |
| | | | 429/246 |
| 2012/0276459 A1 | 11/2012 | Im et al. | |
| 2013/0130091 A1 | 5/2013 | Yang | |
| 2013/0236766 A1* | 9/2013 | Seo | H01M 50/411 |
| | | | 427/458 |
| 2013/0244116 A1 | 9/2013 | Watanabe et al. | |
| 2014/0154543 A1 | 6/2014 | Kim et al. | |
| 2015/0050533 A1 | 2/2015 | Nam et al. | |
| 2015/0050542 A1 | 2/2015 | Mizuno et al. | |
| 2015/0050544 A1 | 2/2015 | Nam et al. | |
| 2015/0162584 A1 | 6/2015 | Uematsu et al. | |
| 2015/0162588 A1 | 6/2015 | Lee et al. | |
| 2015/0171398 A1 | 6/2015 | Roumi | |
| 2015/0249243 A1 | 9/2015 | Nagino et al. | |
| 2015/0303465 A1 | 10/2015 | Watanabe et al. | |
| 2016/0344067 A1* | 11/2016 | Laramie | H01M 4/366 |
| 2016/0351876 A1 | 12/2016 | Jo et al. | |
| 2017/0047590 A1 | 2/2017 | Mikhaylik et al. | |
| 2020/0194797 A1 | 6/2020 | Kim et al. | |

FOREIGN PATENT DOCUMENTS

| | | |
|---|---|---|
| CN | 103996813 A | 8/2014 |
| CN | 104037379 A | 9/2014 |
| CN | 104377328 A | 2/2015 |
| CN | 104377342 A | 2/2015 |
| CN | 104617328 A | 5/2015 |
| CN | 104685670 A | 6/2015 |
| JP | 07-220759 A | 8/1995 |
| JP | 10-241657 A | 9/1998 |
| JP | 3371301 B2 | 1/2003 |
| JP | 4270411 B2 | 6/2009 |
| JP | 4900695 B2 | 3/2012 |
| JP | 2014-107061 A | 6/2014 |
| KR | 10-2006-0030898 A | 4/2006 |
| KR | 10-2007-0062458 A | 6/2007 |
| KR | 10-0772305 B1 | 10/2007 |
| KR | 10-0791791 B1 | 12/2007 |
| KR | 10-0833038 B1 | 5/2008 |
| KR | 10-0833741 B1 | 5/2008 |
| KR | 10-2011-0002889 A | 1/2011 |
| KR | 10-2012-0046092 A | 5/2012 |
| KR | 10-1170218 B1 | 7/2012 |
| KR | 10-2013-0026373 A | 3/2013 |
| KR | 10-2013-0033550 A | 4/2013 |
| KR | 10-2014-0144185 A | 12/2014 |
| KR | 10-2015-0020022 A | 2/2015 |
| KR | 10-1493584 B1 | 2/2015 |
| KR | 10-2015-0070323 A | 6/2015 |
| KR | 10-1601168 B1 | 3/2016 |
| KR | 10-1603627 B1 | 3/2016 |
| WO | WO 2018/070735 A3 | 4/2018 |

OTHER PUBLICATIONS

International Search Report for PCT/KR2017/011042 filed Sep. 29, 2017.
Chinese Office action and Search report dated Jul. 8, 2021.
U.S. Office action from U.S. Appl. No. 16/485,415 dated Oct. 30, 2020.
U.S. Office action from U.S. Appl. No. 16/485,415 dated Feb. 16, 2021.
Korean Office action dated Jan. 28, 2021.
Korean Notice of Allowance dated Jun. 21, 2021.
U.S. Office action received in copending related U.S. Appl. No. 16/485,415 dated Nov. 10, 2021.
Chinese Office action dated Dec. 16, 2021.
Office action receiving in copending U.S. Appl. No. 16/485,415, dated Aug. 20, 2021.

* cited by examiner

ANODE FOR LITHIUM SECONDARY BATTERY AND LITHIUM SECONDARY BATTERY COMPRISING SAME

CROSS-REFERENCE TO THE RELATED APPLICATION

This is the U.S. national phase application based on PCT Application No. PCT/KR2017/011042, filed Sep. 29, 2017, which is based on Korean Patent Application No. 10-2016-0132072, filed Oct. 12, 2016, the entire contents of all of which are hereby incorporated by reference.

TECHNICAL FIELD

An anode for a lithium secondary battery and a lithium secondary battery including the same are disclosed.

BACKGROUND ART

A lithium secondary battery has recently drawn attention as a power source for small portable electronic devices and it uses an organic electrolyte and thereby, has twice as high discharge voltage as a conventional battery using an alkali aqueous solution and accordingly, has a high energy density.

A cathode active material of a lithium secondary battery may be may include an oxide including lithium and a transition metal and having a structure capable of intercalating lithium such as $LiCoO_2$, $LiMn_2O_4$, $LiNi_{1-x}Co_xO_2$ (0<x<1), and the like. In addition, an anode active material may include various carbon-based materials capable of intercalating/deintercalating lithium such as artificial graphite, natural graphite, hard carbon, and the like.

This lithium secondary battery has stability and safety problems, since the cathode and anode thermally become unstable depending on its charge state at a temperature of greater than or equal to 25° C., and thus, the cathode and anode active materials, electrolyte salt, and an organic solvent therein are decomposed.

In addition, a requirement of higher battery stability and safety becomes more difficult to satisfy due to an increasing demand on a higher capacity battery.

DISCLOSURE

Technical Problem

The present invention provides an anode material for a lithium secondary battery having improved penetration safety of a battery, thermal stability, and cycle-life characteristics by improving insulating characteristics of electrodes due to a material having improved heat resistance and durability.

Technical Solution

Another embodiment provides a lithium secondary battery including the anode for a lithium secondary battery.

An embodiment provides an anode for a lithium secondary battery including a current collector; an anode active material layer disposed on the current collector; and a coating layer disposed on the anode active material layer and including an inorganic material and a binder polymer, wherein the binder polymer has a decomposition temperature of 100° C. to 400° C. and the binder polymer has an elastic modulus of 1.0 GPa to 3.0 GPa at 220° C. or lower.

The binder polymer may have a decomposition temperature of 300° C. to 350° C.

The binder polymer may have an elastic modulus of 2.0 GPa to 2.5 GPa at 220° C. or lower.

The binder polymers may be selected from an engineering plastic, a super engineering plastic, soluble polyimide, and a combination thereof.

The binder polymer may be represented by Chemical Formula 1.

[Chemical Formula 1]

In Chemical Formula 1,
Ar is a substituted or unsubstituted C6 to C30 aryl group, and
n is an integer ranging from 4 to 200.

The coating layer may have a thickness of 1 µm to 10 µm.
The coating layer may have a porosity of 30% to 70%.
The inorganic material and the binder polymer may be included in a weight ratio of 99:1 to 60:40.
The binder polymer may be included in an amount of 0.5 wt % to 10 wt % based on a total weight of the anode active material layer and the coating layer.
The inorganic material may be included in an amount of 1 wt % to 20 wt % based on a total weight of the anode active material layer and the coating layer.
The inorganic material may have a packing density of 1.0 $g/cm^3$ to 4.0 $g/cm^3$.
Another embodiment provides a lithium secondary battery including the aforementioned anode; a cathode; an electrolyte; and a separator.

Advantageous Effects

Insulating characteristics of an electrode may be improved by applying a material having improved heat resistance and durability, and thereby a lithium secondary battery having improved penetration safety of a battery, thermal stability, and cycle-life characteristics may be realized.

MODE FOR INVENTION

Hereinafter, embodiments of the present invention are described in detail. However, these embodiments are exemplary, the present invention is not limited thereto and the present invention is defined by the scope of claims.

In the present specification, when specific definition is not otherwise provided, it will be understood that when an element such as a layer, film, region, or substrate is referred to as being "on" another element, it can be directly on the other element or intervening elements may also be present.

In the present specification, when a definition is not otherwise provided, "substituted" refers to replacement of at least one hydrogen of a substituent or a compound by deuterium, a halogen group, a hydroxyl group, an amino group, a C1 to C30 amine group, a nitro group, a silyl group, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C20 alkoxy group, a C1 to C10 trifluoroalkyl group, a cyano group, or a combination thereof.

Figure 1:
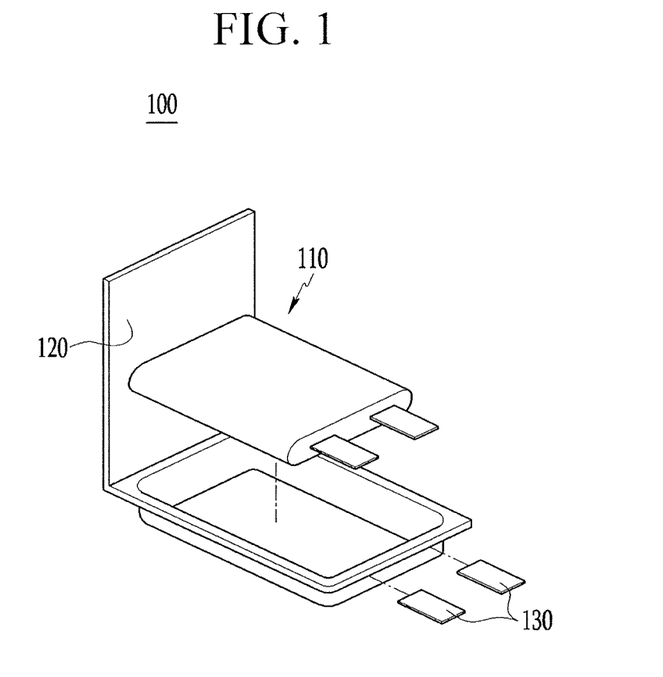
FIG. 1 is a schematic view showing a lithium secondary battery according to an embodiment.
Figure 2:
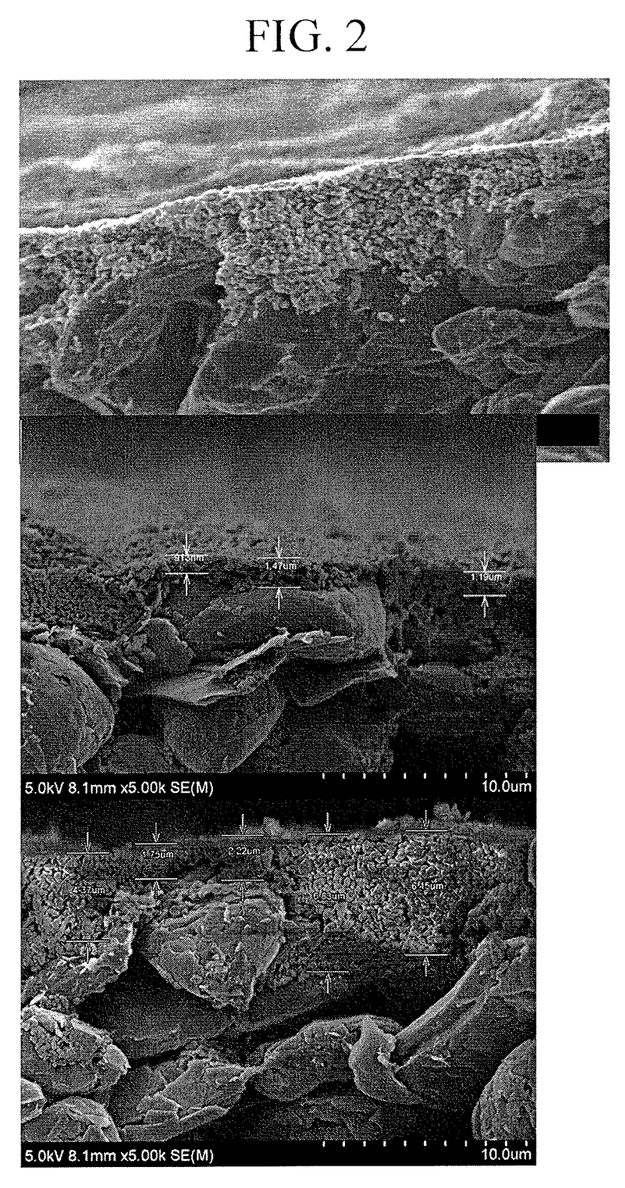
FIG. 2 is a SEM photograph showing a cross-sectional structure of an anode for a lithium secondary battery according to an embodiment.

A lithium secondary battery according to an embodiment is described referring to FIG. 1.

FIG. 1 is a schematic view showing a lithium secondary battery according to an embodiment.

Referring to FIG. 1, a lithium secondary battery 100 according to an embodiment includes an electrode assembly 110, a battery case 120 housing the electrode assembly 110, and an electrode tab 130 playing a role of an electrical channel for externally inducing a current formed in the electrode assembly 110. Both sides of the battery case 120 are overlapped and sealed. In addition, an electrolyte is injected into the battery case 120 housing the electrode assembly 110.

The electrode assembly 110 includes a cathode, an anode facing the cathode, and a separator interposed between the cathode and the anode.

The anode according to an embodiment includes a current collector, an anode active material layer disposed on the current collector and a coating layer disposed on the anode active material layer and including an inorganic material and a binder polymer, wherein the binder polymer has a decomposition temperature of 100° C. to 400° C. and the binder polymer has an elastic modulus of 1.0 GPa to 3.0 GPa at 220° C. or lower.

The binder polymer may have specifically a decomposition temperature of 300° C. to 350° C.

The binder polymer may have specifically an elastic modulus of 2.0 GPa to 2.5 GPa, and more specifically 2.1 GPa to 2.5 GPa at 220° C. or lower.

The binder polymer having a decomposition temperature within the range may be used to improve heat resistance stability of a coating layer and thus thermal stability of a battery.

Figure 4:
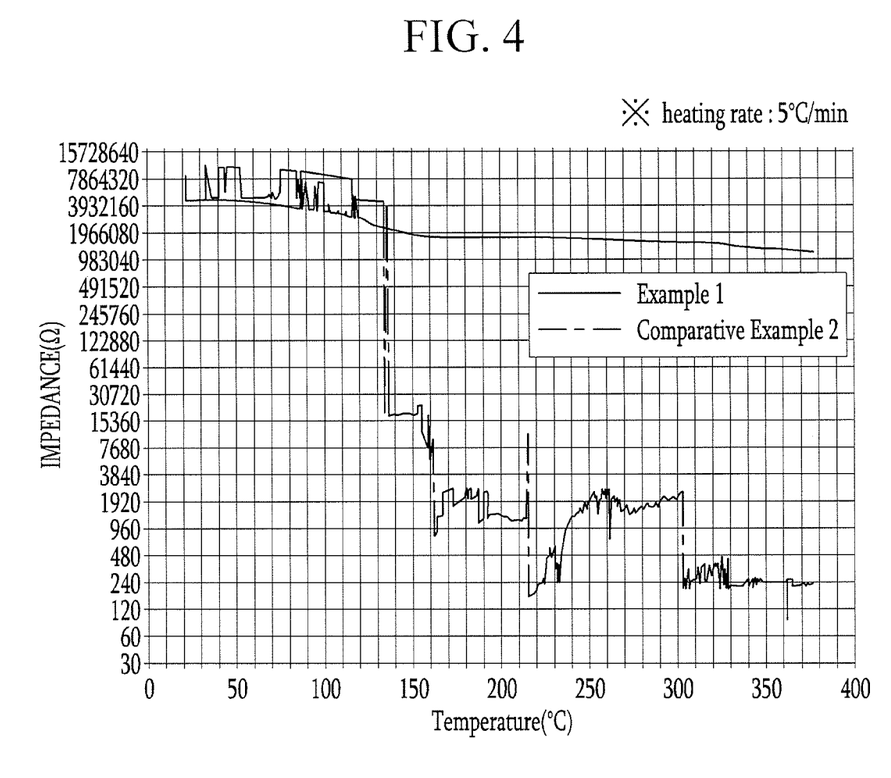
FIG. 4 is a graph showing a relationship between a temperature and a resistance for a lithium secondary battery according to Example 1 and Comparative Example 2.

A lithium secondary battery including the coating layer may maintain insulation characteristics at a high temperature of 350° C. or greater, as shown in FIG. 4 and thus even at a melting temperature of a separator where a battery temperature is increased due to an internal short after the penetration and accordingly the safety of the battery is greatly improved.

The binder polymer having an elastic modulus within the range may be used to maintain strength of the binder polymer even at a high temperature, continuously maintain the insulation characteristics of an anode, and accordingly, improve the battery safety.

The binder polymer may be selected from an engineering plastic, a super engineering plastic, soluble polyimide, and a combination thereof.

For example the engineering plastic may be polyamide, polyacetal, polycarbonate, modified polyphenyl oxide, polybutylene terephthalate, and the like, the super engineering plastic may be polyimide, polysulfone, polyphenylenesulfide, polyamideimide, polyacrylate, polyether sulfone, polyether ether ketone, polyetherimide, a liquid crystal polyester, polyether ketone, but they are not limited thereto, and may be used without limitation as long as the decomposition temperature of the binder polymer is within the range of 100° C. to 400° C. and the elastic modulus thereof is 1.0 GPa to 3.0 GPa at 220° C. or lower.

In a specific embodiment of the present invention, the binder polymer may be represented by Chemical Formula 1.

[Chemical Formula 1]

In Chemical Formula 1,

Ar is a substituted or unsubstituted C6 to C30 aryl group, and n is an integer ranging from 4 to 200.

Heat generation of a battery may be suppressed and a short circuit between a cathode and an anode may be prevented by using a coating layer including the binder polymer, and thus safety, thermal stability, and cycle-life characteristics of the lithium secondary battery may be improved.

In particular, the binder polymer represented by Chemical Formula 1 is dissolved in a solvent in a state of almost complete polymerization unlike conventional polyimide as well as has heat resistance at a high temperature of 200° C. or greater and thus may maintain an anode insulation at a high temperature without deteriorating battery performance, and accordingly it would have enabled the secondary battery to secure stability against penetration and heat exposure.

In other words, the conventional polyimide is synthesized by synthesizing polyamic acid (PAA) through a primary polymerization and heating the polyamic acid at a high temperature (300° C. or greater) to convert it into polyimide through a dehydration reaction; or by polymerizing commercially available units, which are diluted in a solvent and present in a monomer or oligomer state, at a high temperature, and herein, since the dehydration process is necessary, water is generated. Either method of these syntheses should go through the dehydration process and thus requires a process condition of a high temperature.

At a general process drying temperature of 150° C. or less, a conversion rate into polyimide is low and battery performance may be deteriorated due to the water generation and thus there is a limit as an insulation layer.

Accordingly, the binder polymer represented by Chemical Formula 1 with high heat resistance may be used to densify an inorganic material in a coating layer and maintain electrode insulation at a high temperature of 200° C. or greater and accordingly, improve an insulation layer of an electrode.

A method of synthesizing the polyamideimide represented by Chemical Formula 1 is not particularly limited, but when the polyamideimide is synthesized by a diisocyanate method that is a direct synthesis method, as imidization is almost completed, a few non-reacted imide moieties are present, and thus there is a relatively less influence on battery performance due to the non-reacted imide moieties.

The coating layer may have a thickness of 1 μm to 10 μm, specifically 1 μm to 5 μm, 1 μm to 4 μm, and more specifically 1 μm to 3 μm.

When the coating layer has a thickness within the range, an electrical insulation layer may be formed on the surface of the anode and thus prevent a short circuit between a cathode and an anode.

The coating layer may have a porosity of 30% to 70%, specifically 40% to 60%, and more specifically, 50% to 55%.

When the coating layer has porosity within the range, battery performance may be secured by improving mobility of lithium ions and thus minimizing transfer resistance of the lithium ions.

The inorganic material and the binder polymer may be included in a weight ratio of 99:1 to 60:40, specifically 99:1 to 70:30, 99:1 to 80:20, and more specifically 96:4 to 80:20.

The binder polymer may be included in an amount of 0.5 wt % to 10 wt %, and specifically 3 to 7 wt % based on a total weight of the anode active material layer and the coating layer.

When the binder polymer is included within the weight range, thermal stability may be improved by suppressing a battery from being heated.

The binder polymer may have a weight average molecular weight of 1,000 to 50,000, and specifically 10,000 to 20,000.

When the binder polymer has a weight average molecular weight within the range, battery performance may be secured by minimizing transfer resistance of lithium ions.

The inorganic material may be included in an amount of 1 wt % to 20 wt %, and specifically 5 wt % to 12 wt % based on a total weight of the anode active material layer and the coating layer. When the inorganic material is included within the range, the coating layer may have excellent electrical insulation and thus prevent a short circuit between a cathode and an anode.

The inorganic material may have a packing density of 1.0 g/cm$^3$ to 4.0 g/cm$^3$ and specifically, 1.5 g/cm$^3$ to 3.0 g/cm$^3$.

The packing density indicates density of powder before firing after compressing and drying the inorganic material, and when the packing density is within the range, there may be a great effect of improving heat resistance.

The inorganic material may be $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a combination thereof.

The inorganic material may have an average particle diameter ranging from 0.1 μm to 5 μm, and specifically 0.3 μm to 1 μm. When the average particle diameter of the inorganic material is within the range, the inorganic material may be uniformly coated on the anode active material layer and thus have excellent electrical insulation and accordingly, prevent a short circuit between a cathode and an anode. In addition, performance of a secondary battery may be secured by minimizing transfer resistance of lithium ions.

A binder that is different from the binder polymer may be further included in addition to the binder polymer. Examples of the binder may be a styrene-butadiene rubber (SBR), carboxylmethylcellulose (CMC), polyvinylidenefluoride (PVdF), a polyvinylidenefluoride-hexafluoropropylene (PVdF-HFP) copolymer, ethylenevinylacetate (EVA), hydroxyethylcellulose (HEC), polyvinylalcohol (PVA), polyvinylbutyral (PVB), an ethylene-acrylic acid copolymer, acrylonitrile, a vinyl acetate derivative, polyethyleneglycol, an acryl-based rubber, or a combination thereof, and preferably the styrene-butadiene a rubber (SBR), a mixture of the styrene-butadiene rubber (SBR) and the carboxylmethylcellulose (CMC), the ethylenevinylacetate (EVA), the polyvinylalcohol (PVA), the ethylene-acrylic acid copolymer, or the acryl-based a rubber may be used.

When the binder is included in the coating layer, adhesive to the anode surface may be improved and adhesives between organic material particles, between inorganic material particles, or between the organic material particles and inorganic material particles may be improved.

The current collector of the anode may be a copper foil.

The anode active material layer may include an anode active material, a binder, and optionally a conductive material.

The anode active material may be a material that reversibly intercalates/deintercalates lithium ions, lithium metal, a lithium metal alloy, a material capable of doping and dedoping lithium, or a transition metal oxide.

The material that reversibly intercalates/deintercalates lithium ions may be a carbon material that may be any generally-used carbon-based anode active material in a lithium secondary battery, and examples thereof may be crystalline carbon, amorphous carbon, or a combination thereof. The crystalline carbon may be non-shaped, or may be sheet, flake, spherical, or fiber shaped natural graphite or artificial graphite and the amorphous carbon may be soft carbon (carbon fired at a low temperature) or hard carbon, a mesophase pitch carbonized product, fired cokes, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$ (0<x<2), a Si—C composite, a Si-Q alloy (wherein Q is an alkali metal, an alkaline-earth metal, Group 13 to Group 16 elements, a transition metal, a rare earth element or a combination thereof, and not Si), Sn, $SnO_2$, a Sn—C composite, Sn—R (wherein R is an alkali metal, an alkaline-earth metal, Group 13 to Group 16 elements, a transition metal, a rare earth element or a combination thereof, and not Sn), and the like and at least one of these materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, and like.

The binder improves binding properties of anode active material particles with one another and to a current collector, and examples thereof may be polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity, any electrically conductive material may be used as a conductive material unless it causes a chemical change, and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver and the like; a conductive polymer such as a polyphenylene derivative; or a mixture thereof.

The anode may be manufactured by mixing the anode active material, the binder, and the conductive material in a solvent to prepare an anode active material composition and coating the anode active material composition on the anode current collector. Herein, the solvent may be N-methylpyrrolidone, but is not limited thereto.

The cathode includes a current collector and a cathode active material layer disposed on the current collector.

The current collector may use aluminum, but is not limited thereto.

The cathode active material layer includes a cathode active material.

The cathode active material may be a compound (lithiated intercalation compound) capable of intercalating and deintercallating lithium, and specifically a lithium metal oxide.

The lithium metal oxide may specifically include at least one metal selected from cobalt, manganese, nickel and aluminum, and lithium. More specifically, compounds represented by one of the following chemical formulae may be used.

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$ In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The lithium metal oxide may be more specifically a lithium nickel cobalt manganese oxide, a lithium nickel cobalt aluminum oxide, or a combination thereof, and among them, a mixture of the lithium nickel cobalt manganese oxide and the lithium nickel cobalt aluminum oxide may be used.

The cathode active material layer may further include a binder and a conductive material in addition to the aforementioned cathode active material.

The binder improves binding properties of cathode active material particles with one another and to a cathode current collector, and examples thereof may include polyvinylalcohol, carboxylmethylcellulose, hydroxypropylcellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode, any electrically conductive material may be used as a conductive material, unless it causes a chemical change and examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The electrolyte includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based, and aprotic solvent.

The carbonate-based solvent may be, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Particularly, when a cyclic carbonate compound and a linear carbonate compound are mixed together, a solvent having a low viscosity as well as an increased dielectric constant may be obtained. In this case, the cyclic carbonate compound and the linear carbonate compound may be mixed together in a volume ratio of about 1:1 to 1:9.

The ester-based solvent may include, for example methylacetate, ethylacetate, n-propylacetate, dimethylacetate, methylpropinonate, ethylpropinonate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethanol, isopropyl alcohol, and the like.

The non-aqueous organic solvent may be used alone or in a mixture and when it is used in a mixture, a mixing ratio may be controlled in accordance with a desirable battery performance.

The non-aqueous electrolyte may further include an overcharge-inhibiting additive such as ethylene carbonate, pyrocarbonate, and like.

The lithium salt dissolved in the organic solvent supplies lithium ions in the battery, and operates a basic operation of a lithium secondary battery and improves lithium ion transportation between a cathode and an anode.

The lithium salt may include one selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$ (lithium bis(oxalato) borate, or a combination thereof.

The lithium salt may be used at a concentration ranging from about 0.1 M to about 2.0 M. When the lithium salt is included at the above concentration range, an electrolyte may have excellent performance and lithium ion mobility due to appropriate conductivity and viscosity of an electrolyte.

The separator may include any materials commonly used in the conventional lithium battery as long as separating the anode from the cathode and providing a transporting passage of lithium ions. In other words, it may have a low resistance to ion transport and an excellent impregnation for electrolyte. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, a polyolefin-based polymer separator such as polyethylene, polypropylene or the like is mainly used and in order to ensure the heat resistance or mechanical strength, a coated separator including a ceramic component or a polymer material may be used and may have a mono-layered or multi-layered structure as needed.

Hereinafter, the embodiments are illustrated in more detail with reference to examples. It is to be understood, however, that the examples described below are only for illustrative purposes or to illustrate the present invention, and the present invention should not be limited thereby.

Furthermore, what is not described in this disclosure may be sufficiently understood by those who have knowledge in this field and will not be illustrated here.

Example 1

(Manufacture of Anode)

4 wt % of polyamideimide (Kukdo Chemical Co., Ltd.) having a decomposition temperature of 370° C. and a weight average molecular weight of 15,000 and 96 wt % of $Al_2O_3$ (AES-11, Sumitomo Chemical Co.) having a size of 0.48 μm were mixed in an N-methylpyrrolidone solvent to prepare a coating composition, 97.5 wt % of graphite, 1.5 wt % of a styrene-butadiene rubber (SBR), and 1 wt % of carboxyl methylcellulose (CMC) were added to a water to prepare slurry.

The slurry was coated on a copper foil and dried and then, roll-pressed to form an anode active material layer. Subsequently, on the anode active material layer, the coating composition was coated to form an insulation layer, and herein, the coating insulation layer had a thickness of 3 μm.

(Manufacture of Cathode)

94 wt % of a mixture of 80 wt % of $LiNi_{0.33}Co_{0.33}Mn_{0.33}O_2$ and 20 wt % of $LiNi_{0.8}Co_{0.15}Al_{0.05}O_2$, 3 wt % of carbon black, and 3 wt % of polyvinylidenefluoride were added to an N-methylpyrrolidone (NMP) solvent to prepare slurry. The slurry was coated on an aluminum (Al) thin film and dried and then, roll-pressed to manufacture a cathode.

(Manufacture of Electrolyte)

An electrolyte was prepared by adding 1.15 M of $LiPF_6$ to a mixed solvent of ethylene carbonate, ethylmethyl carbonate, and dimethyl carbonate in a volume ratio of 2:4:4.

(Manufacture of Lithium Secondary Battery Cell)

The cathode, the anode, and the electrolyte were used along with a polyethylene separator to manufacture a lithium secondary battery cell.

Example 2

A lithium secondary battery cell was manufactured according to the same method as Example 1 except that the insulation layer was formed to be 1 μm thick.

Comparative Example 1

A lithium secondary battery cell was manufactured according to the same method as Example 1 except that the coating layer was not formed.

Comparative Example 2

A lithium secondary battery cell was manufactured according to the same method as Example 1 except that the anode was manufactured as follows.

4 wt % of an acryl-based rubber (BM-520B, Zeon Corp.) and 96 wt % of $Al_2O_3$ (AES-11, Sumitomo Chemical Co.) having a size of 0.48 μm were mixed in an N-methylpyrrolidone solvent to prepare a coating composition. The coating composition was coated on the anode active material layer to form an anode insulation layer and thus manufacture an anode. Herein, the insulation layer was formed to have a thickness of 3 μm.

Comparative Example 3

A lithium secondary battery cell was manufactured according to the same method as Example 1 except that the anode was manufactured as follows.

4 wt % of polyimide (BP Grade, Unitika Ltd.) and 96 wt % of $Al_2O_3$ (AES-11, Sumitomo Chemical Co.) having a size of 0.48 μm were mixed in an N-methylpyrrolidone solvent to prepare a coating composition. The coating composition was coated on the anode active material layer to form an anode insulation layer and thus manufacture an anode. Herein, the insulation layer was formed to have a thickness of 3 μm.

Evaluation 1: Swelling Degree Comparison about Electrolyte

Impregnation degrees of electrolyte to the binders according to Example 1 and Comparative Example 3 were compared by measuring swelling degrees of the binders to the electrolyte, and the results are shown in Table 1.

The swelling degrees were obtained by measuring an initial weight after respectively coating the binders to have a constant thickness and a constant size and an impregnated weight after impregnating the coated binders in the electrolyte at 70° C. for 2 hr and then, calculating a weight ratio of the impregnated weight to the initial weight of the coated binders.

TABLE 1

| Binder film | Used electrolyte | Swelling degree regarding electrolyte |
|---|---|---|
| Comparative Example 3 | EC/EMC/DMC = 2/4/4 vol (1.5M $LiPF_6$) | 1.02 times |
| Example 1 | | 1.25 times |

Referring to Table 1, Example 1 not only has an improved long term cycle-life characteristic due to a complete imidization but also contribute to improving cell resistance problem, as the binders basically showed a swelling degree of about 20% and thus maintained insulation characteristics and resultantly, as well as improved ion conductivity according to a resistance decrease by absorbing an electrolyte.

Evaluation 2: Penetration Safety of Lithium Secondary Battery Cells

Penetration safety of the lithium secondary battery cells according to Examples 1 and 2 and Comparative Examples 1 to 3 was evaluated, and the results are shown in Table 2.

The lithium secondary battery cells were charged at a charge current of 0.2 C up to 4.25 V under a cut-off condition of 0.05 C, and a penetration evaluation thereof was performed by using a pin having a diameter of 3.0 mm at a rate of 150 mm/sec.

TABLE 2

|  | Examples | | Comparative Examples | | |
|---|---|---|---|---|---|
|  | 1 | 2 | 1 | 2 | 3 |
| Penetration safety evaluation results | Non-ignition (maximum temperature: 98° C.) | Non-ignition (maximum temperature: 120° C.) | Explosion (maximum temperature: 551° C.) | Ignition (maximum temperature: 451° C.) | Non-ignition (maximum temperature: 123° C.) |

Referring to Table 2, Examples 1 and 2 using an anode having a coating layer including polyamideimide on an anode active material layer according to one embodiment showed excellent penetration safety compared with Comparative Example 1 using an anode having no coating layer and Comparative Example 2 using an anode having a coating layer including an acrylate binder. In addition, Example 1 including a heat resistant binder in a higher amount, that is, having a thicker coating layer showed the more excellent penetration safety between Examples 1 and 2.

The cell having a coating insulation layer by using a polyimide binder according to Comparative Example 3 showed improved penetration safety due to excellent heat resistance of the binder, but as aforementioned, since the polyimide binder did not complete of imidization at a 150° C. of secondary battery drying temperature, performance deterioration might occur due to continuous moisture generation during the battery operation.

Evaluation 3: Performance of Lithium Secondary Battery Cells

Figure 3:
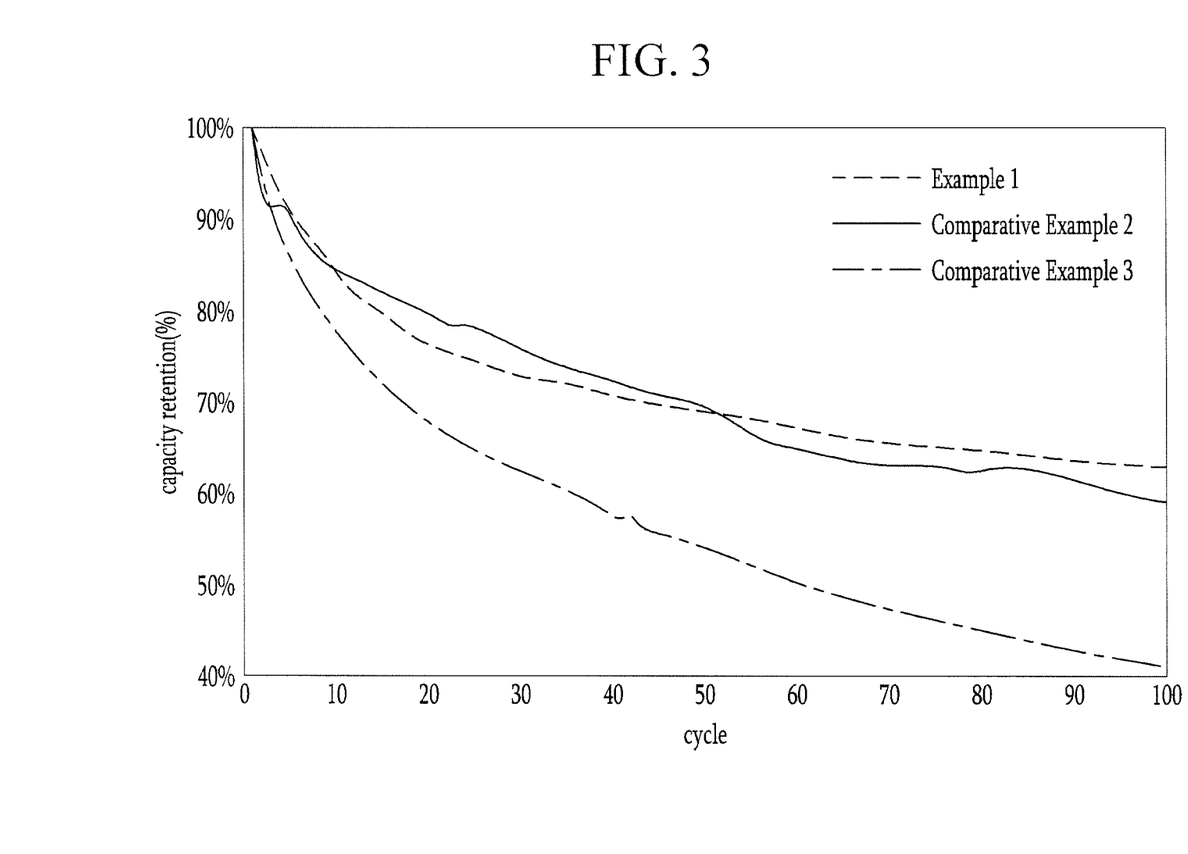
FIG. 3 is a graph comparing cycle-life characteristics for lithium secondary battery cells at a room temperature according to Example 1 and Comparative Examples 2 and 3.

FIG. 3 is a graph comparing room temperature cycle-life characteristics of lithium secondary battery cells according to Example 1 and Comparative Examples 2 and 3. The lithium secondary battery cell was charged at a charge current of 1.0 C up to 4.25 V under a cut-off condition of 0.05 C and discharged at a discharge current of 1.0 C under a cut-off condition of 2.8 V, and cycle-life characteristics of the cell were evaluated at room temperature.

Referring to FIG. 3, the cells having an insulation layer formed of a coating layer including polyamideimide and acrylate as a binder (Example 1 and Comparative Example 2) relatively secured stable cycle-life characteristics, but Comparative Example 3 having an insulation layer formed of a coating layer including polyimide as a binder showed a cycle-life maintenance rate decrease down to 40% at the 100$^{th}$ cycle and thus cycle-life maintenance characteristics of 65% compared with Example 1 and accordingly, might not be actually put to use.

Evaluation 4: Heat Resistance of Lithium Secondary Battery Cell

A resistance change of the lithium secondary battery cells of Example 1 and Comparative Example 2 depending on a temperature was evaluated, and the results are shown in FIG. 4.

FIG. 4 is a graph showing a relationship between a temperature and a resistance of the lithium secondary battery cells according to Example 1 and Comparative Example 2.

Referring to FIG. 4, Example 1 having an insulation layer formed of a coating layer including polyamideimide as a binder maintained insulation characteristics at 150° C. or higher and a high temperature of 350° C. or higher compared with Comparative Example 2 having an insulation layer formed of a coating layer including acrylate as a binder and thus at a melting temperature of a separator where a battery temperature was increased due to an internal short after the penetration and resultantly, the safety of the battery may be greatly improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: lithium secondary battery
110: electrode assembly
120: battery case
130: electrode tab

The invention claimed is:

1. An anode for a lithium secondary battery, comprising:
a current collector;
an anode active material layer disposed on the current collector; and
a coating layer disposed on the anode active material layer and including an inorganic material and a binder polymer represented by Chemical Formula 1,
wherein:
the binder polymer has a decomposition temperature of 100° C. to 400° C.,
the binder polymer has an elastic modulus of 1.0 GPa to 3.0 GPa at 220° C. or lower,
a weight ratio of the inorganic material:the binder polymer is 99:1 to 80: 20,
the binder polymer is included in an amount of 0.5 wt % to 10 wt % and the inorganic material is included in an amount of 1 wt % to 20 wt %, the wt % being based on a total weight of the anode active material layer and the coating layer,

[Chemical Formula 1]

in Chemical Formula 1,

Ar is a substituted or unsubstituted C6 to C30 aryl group, and n is an integer ranging from 4 to 200.

2. The anode for a lithium secondary battery as claimed in claim 1, wherein the binder polymer has a decomposition temperature of 300° C. to 350° C.

3. The anode for a lithium secondary battery as claimed in claim 1, wherein the binder polymer has an elastic modulus of 2.0 GPa to 2.5 GPa at 220° C. or lower.

4. The anode for a lithium secondary battery as claimed in claim 1, wherein the binder polymer is selected from an engineering plastic, a super engineering plastic, soluble polyimide, and a combination thereof.

5. The anode for a lithium secondary battery as claimed in claim 1, wherein the coating layer has a thickness of 1 μm to 10 μm.

6. The anode for a lithium secondary battery as claimed in claim 1, wherein the coating layer has a porosity of 30% to 70%.

7. The anode for a lithium secondary battery as claimed in claim 1, wherein the inorganic material has a packing density of 1.0 g/cm$^3$ to 4.0 g/cm$^3$.

8. A lithium secondary battery, comprising the anode as claimed in claim 1;
a cathode;
an electrolyte; and
a separator.

9. A lithium secondary battery, comprising the anode as claimed in claim 4;
a cathode;
an electrolyte; and
a separator.

10. A lithium secondary battery, comprising the anode as claimed in claim 5;
a cathode;
an electrolyte; and
a separator.

11. A lithium secondary battery, comprising the anode as claimed in claim 6;
a cathode;
an electrolyte; and
a separator.

12. A lithium secondary battery, comprising the anode as claimed in claim 7;
a cathode;
an electrolyte; and
a separator.

* * * * *